April 16, 1935.  J. H. RIEHLMANN  1,997,746
OIL FILTER
Filed June 14, 1933
Fig-1-
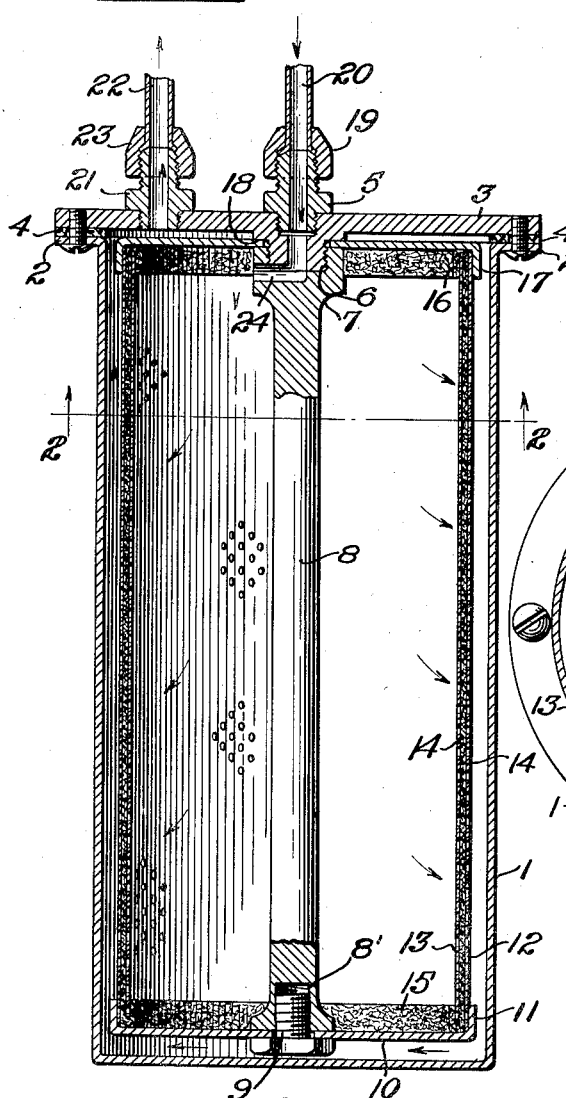
Fig-2-
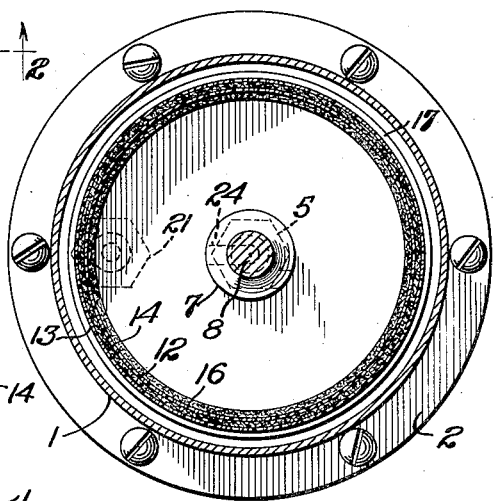
Fig-3-
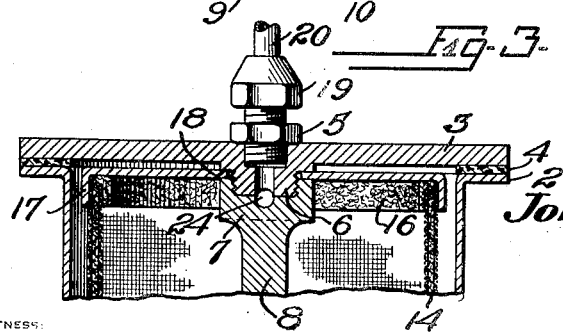
John H. Riehlmann,
INVENTOR
BY Victor J. Evans & Co.
ATTORNEY
WITNESS:
H. P. Mead Patented Apr. 16, 1935

1,997,746

UNITED STATES PATENT OFFICE 1,997,746

OIL FILTER

John H. Riehlmann, Memphis, Tenn., assignor of one-half to Harry Kabakoff, Memphis, Tenn.

Application June 14, 1933, Serial No. 675,811

2 Claims. (Cl. 210—183)

This invention is an oil filter and has for its object the provision of a very simple and inexpensive filter which will operate efficiently to remove impurities from oil and similar liquids, the invention being designed primarily for use upon automobiles for filtering the oil or the fuel.

Another object of the invention is to provide a filter for the purposes stated in which the parts may be very easily and quickly assembled or disassembled when cleaning or renewal is necessary.

The invention resides in certain features which will be hereinafter first fully described and more particularly defined in the appended claims.

In the accompanying drawing:—

Figure 1 is a longitudinal section of a filter embodying the present invention.

Figure 2 is a section on the line 2—2 of Figure 1.

Figure 3 is a section of the upper end of the filter taken at right angles to Figure 1.

In carrying out the invention, I provide a jar or cylindrical container 1 which may be of any suitable material and has its bottom preferably integral with its sides. The upper open end of the container is provided with an annular flange 2 upon which is secured a cover 3, a gasket 4 of any suitable material being interposed between the cover and the flange to prevent leakage. The cover is provided centrally with a threaded opening which receives a nipple 5 and on the underside of the cover, aligned axially with the nipple, is a boss 6 which is engaged by the head 7 of a post 8 which depends from the boss and has a threaded socket 8' in its lower end to receive a clamping bolt 9. The bolt 9 passes through a plate 10 having an annular rim or flange 11 and constituting a cap or head receiving the lower end of the filtering body. Said body consists of concentric cylinders 12 and 13 of foraminous material having sufficient rigidity to retain their shape and a filling 14 of cotton, wool or similar material which is disposed between the two cylinders and has its lower end folded around the lower end of the inner cylinder, as shown at 15. The upper end of the filler is folded around the upper end of the inner cylinder, as shown at 16, and an upper cap or head 17 is fitted around the upper end of the filtering body as clearly shown in Figures 1 and 3. This head or upper cap 17 is provided with a central opening through which the boss 6 extends so that an annular shoulder 18, formed on the boss, will rest upon the cup as will be understood. Before the cover is fastened by the bolts inserted through the same and the flange 2, it is rotated so that the boss 6 will be turned home within the head 7 and thereby clamp the filtering body firmly in place, it being understood, of course, that the bolt 9 is turned home against the bottom of the filtering body in order to secure the lower end. The nipple 5, as clearly shown in the drawing, is provided with a central flange to receive a turning tool whereby it may be turned home in the cover and the upper end of the nipple receives a coupling collar 19, whereby a feed pipe 20 is connected to the filter. Located eccentrically in the cover is a threaded outlet opening receiving a nipple 21 similar in all respects to the nipple 5 and having the outlet pipe 22 connected thereto by a coupling 23, as shown in Figure 1, as will be understood.

The construction and arrangement of the several parts being thus made known, it is thought the operation and advantages of the device will be readily understood and appreciated. The liquid enters through the boss 6 and the head 7, the later being provided with a port or passage 24 leading to its side, as clearly shown. The liquid will descend within the filtering body and by its inherent pressure will flow through the perforations of the cylinders 12 and 13 and through the interstices of the filler 14, the latter serving to effectually prevent the passage of dust and other foreign particles which may be in the liquid. The liquid will be confined within the container 1 and will rise to the top thereof and then flow over the upper cap 17 and pass out through the nipple 21 and the outlet pipe in an obvious manner. By causing the liquid to flow downwardly, as stated, the foreign particles which cannot go through the filtering cloth or filler will be prevented from agitating and will settle at the bottom so that the life of the filter will be prolonged, and this result is aided by having the discharge at the top, inasmuch as if for any reason any foreign matter should pass through the filter, it would settle at the bottom of the container together with any water or other moist elements. Whenever it should be necessary to clean the filter all that is to be done is to remove the cover, whereupon the filtering body may be lifted from the container without disturbing the container. When renewal of the filtering cloth should be necessary, the cap 10, the cylinders 12, 13, and the filler 24 may be easily removed and a new filler substituted for the worn one in a few minutes. The filler is reinforced on both sides, thereby lessening the liability of punctures in the event the cloth should become clogged.

Having described the invention, I claim:

1. A filter comprising a container having an open upper end and a closed lower end, a cover for closing the open upper end of the container and provided with inlet and outlet openings and a boss formed on the under side of the cover concentric with the inlet opening, a filtering body consisting of inner and outer spaced foraminous cylinders and a filter held by and between said cylinders, a post having a port in its upper end and a socket in the lower end thereof, said post being fitted to the boss with the port communicating with the inlet opening, an upper flanged cap closing one end of the cylinders and having an opening for receiving the boss, a lower flanged cap for closing the opposite end of the cylinders and having an opening registering with the socket of the post, and a fastening member positioned between the lower extremity of the post and the closed end of the container.

2. A filter comprising a container having an open upper end and a closed lower end, a cover secured upon the open upper end of the container and provided with inlet and outlet openings, a boss formed on the under side of the cover concentric with the inlet opening, a filtering body consisting of inner and outer spaced foraminous cylinders and a filter held by and between said cylinders, a post having a port in its upper end and a socket in the lower end thereof, said post being fitted to the boss with the port communicating with the inlet opening, an upper flanged cap closing one end of the cylinders and having an opening for receiving the boss, a lower flanged cap for closing the opposite end of the cylinders and having an opening registering with the socket of the post, and a fastening member threadedly engaging in the socket of the post and positioned between the closed end of the container and last mentioned cap for clamping the ends of the filtering body between said caps.

JOHN H. RIEHLMANN.